May 1, 1962  R. E. JOHNSON  3,032,618
TIMER CONTROL APPARATUS
Filed Sept. 17, 1959  2 Sheets-Sheet 2
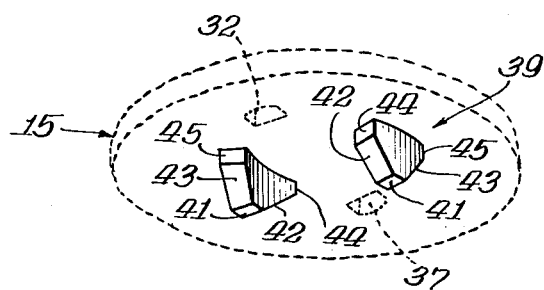
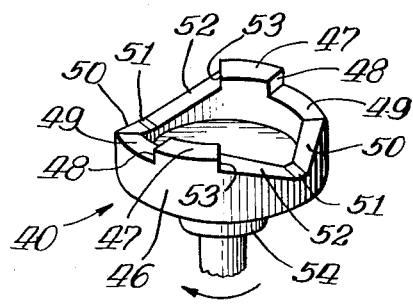
INVENTOR.
Robert E. Johnson.
BY
Hofgren, Brady, Wegner,
Allen & Stellman  Attys.

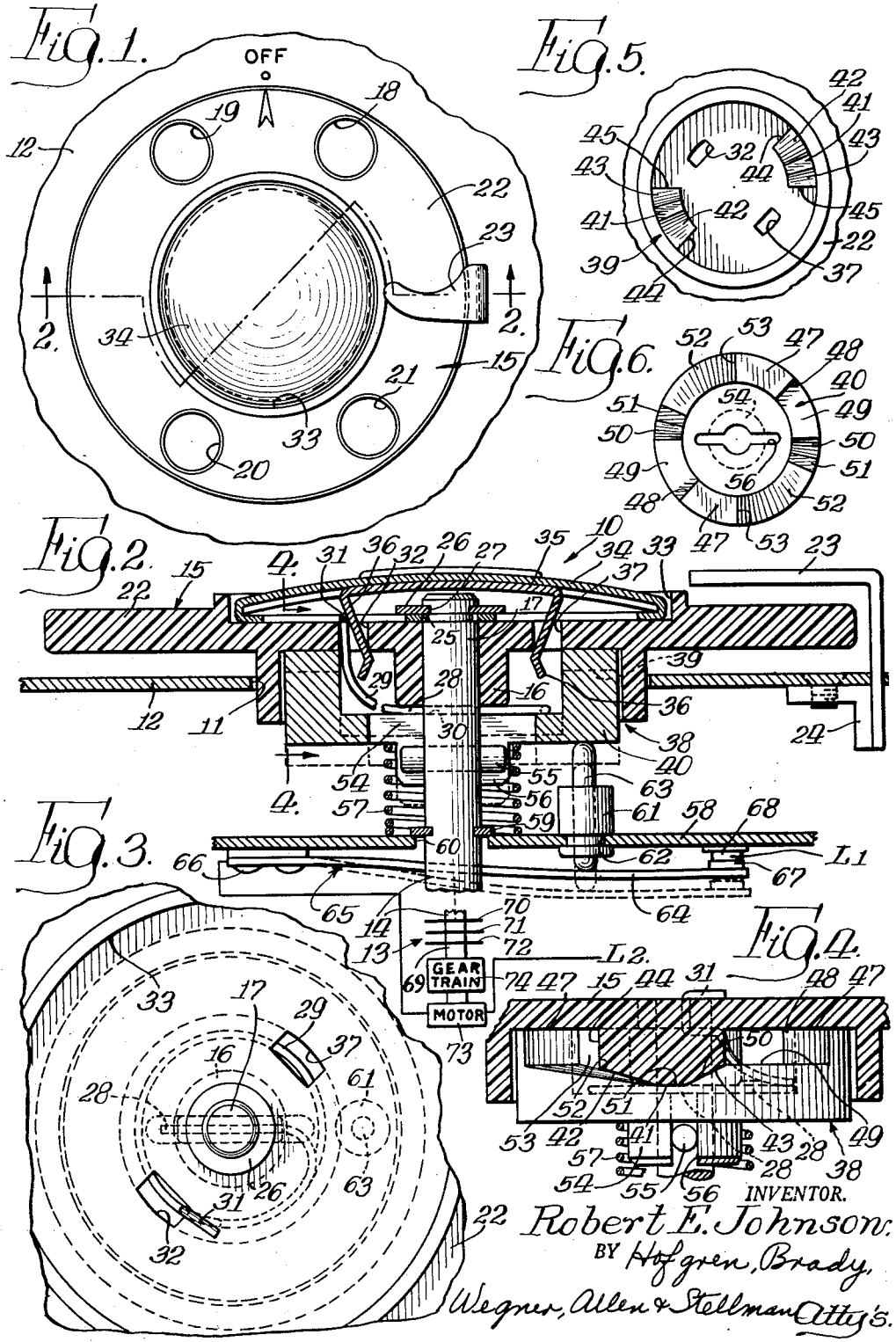

3,032,618
Patented May 1, 1962

3,032,618
TIMER CONTROL APPARATUS
Robert E. Johnson, St. Paul, Minn., assignor to Whirlpool Corporation, a corporation of Delaware
Filed Sept. 17, 1959, Ser. No. 840,588
14 Claims. (Cl. 200—38)

This invention relates to timer control apparatus and in particular to timer control apparatus arranged for selectable operation of the device being controlled.

Simplification of control means of devices such as home appliances is a desideratum from the standpoints of economy of manufacture, foolproof operation, and facility of use by the operator. The instant invention comprehends a control device for use in an appliance such as a dishwasher providing each of these desirable features.

More specifically, one feature of the invention is the provision of an improved control apparatus having a dial type actuating means.

Another feature is the provision of such a control apparatus providing automatic discontinuation of the operation of the device controlled thereby during adjustment of the control apparatus.

A further feature is the provision of such a control apparatus having new and improved means permitting the operator to stop operation of the device controlled by the apparatus as desired and permitting automatic return to the portion of the cycle of control at which the device was stopped.

Still another feature is the provision of such a control apparatus including a timing mechanism having a shaft, the mechanism driving the shaft in one direction of rotation to a first position from any one of a plurality of rotational positions spaced from the first position, a manually operable member, and cam means connecting the manually operable member to the shaft to rotate the shaft in one direction of rotation upon a movement of the manually operable member in one direction, the cam means being arranged to permit a preselected amount of movement of the manually operable member before rotation of the shaft is effected thereby.

A still further feature is the provision of such control apparatus wherein the manually operable member is a rotatable dial and the cam means provides a lost motion connection over a preselected range of rotation of the dial without rotation of the shaft and further including means operated by the cam means within the range of rotation to prevent the driving operation of the timing mechanism thereof.

Still another feature is the provision of such a control apparatus having means biasing the dial to a midposition of the range of rotation thereof, the means for preventing driving operation of the mechanism being operated only when the dial is displaced from said midposition of the range.

Yet another feature of the invention is the provision of such a control apparatus wherein the biasing means is operative to urge the dial to the midposition only from one side thereof.

A further feature is the provision of such control apparatus wherein the cam means comprises a first cam element movable with the dial and a second cam element rotatably fixed and axially movable on the shaft and operated by the first cam element to effect rotation of the shaft as the result of rotation of the second cam element by the first cam element and arrange the means for selectively preventing driving operation of the mechanism to so prevent driving operation as a result of axial movement of the second cam element by the first cam element.

Still another feature is the provision of such a control apparatus wherein one cam element comprises a projection and the other cam element includes a concave surface opening toward the projection and having a midportion of greatest depth, inclined portions extending laterally from the midportion, and transverse portions defining the opposite ends of the concave surface.

Still another feature is the provision of such control apparatus including means axially biasing the cam elements to seat the projection on the concave surface.

Yet another feature is the provision of such a control apparatus further including means rotatably biasing at least one of the cam elements to dispose the projection at the midportion of the surface.

A yet further feature of the invention is the provision of such control apparatus wherein the concave surface further includes a portion extending perpendicular to the shaft axis and the axially biasing means effects a maintained frictional engagement between the perpendicular portion of the surface and the projection.

Other features and advantages of the invention will be apparent from the following description taken in connection with the accompanying drawings wherein:

FIGURE 1 is a plan of a control apparatus embodying the invention, and showing a portion of a panel of the device in which the control apparatus is installed.

FIGURE 2 is an enlarged, vertical section thereof taken substantially along the line 2—2 of FIGURE 1, the timer mechanism thereof being shown diagrammatically.

FIGURE 3 is a fragmentary plan thereof with the center disc removed.

FIGURE 4 is a vertical section thereof taken substantially along the line 4—4 of FIGURE 2.

FIGURE 5 is a fragmentary bottom view of the dial illustrating the cam means thereof.

FIGURE 6 is a plan of the lower cam means.

FIGURE 7 is a perspective, upwardly looking view of the upper cam means.

FIGURE 8 is a perspective, downwardly looking view of the lower cam means.

In the exemplary embodiment of the invention as disclosed in the drawings, a control apparatus generally designated 10 is arranged to extend through a suitable opening 11 in a panel 12 of an appliance such as an automatic dishwasher. The control apparatus includes a timer mechanims 13 of conventional construction having a manually presettable output shaft 14 projecting from the mechanism 13 coaxially through opening 11 of panel 12. In using timer mechanism 13 as a sequential control for an appliance such as a dishwasher, the opposite end 69 of rotatable shaft 14 carries a plurality of programming cams 70, 71 and 72 which control the operational sequence of the dishwasher and which are rotated by means of a synchronous timer motor 73 through an approximate speed reducing mechanism 74 geared to shaft end 69. Mechanism 13 functions in the conventional manner to drive shaft 14 in one direction of rotation (herein clockwise as seen in FIGURE 1) from a first position (herein the position of the shaft with the timer mechanism in "Off" arrangement) to any one of a plurality of rotational positions spaced from the first position (herein at least 6° from the "Off" position). Thus, timer mechanism 13 operates to control the functioning of the dishwasher in a preselected cycle of operation during which shaft 14 rotates from the position in which it is set to the "Off" position. The full cycle of operation effected by timer mechanism 13 would be effected by manually rotating shaft 14 in a clockwise direction (as seen in FIGURE 1) 6° from the "Off" position whereupon timer mechanism 13 rotates the shaft the remaining 354° back to the "Off" position. Presetting of shaft 14 by manual rotation of that member at a rate faster than that at which it is driven by its driving motor is accommodated by the conventional one-way clutch or escapement device normally provided in the drives of such appliance timers. By manually rotating the shaft a greater number of degrees from the "Off" position lesser portions of the complete cycle may be obtained.

Manual rotation of shaft 14 is effected in control apparatus 10 by suitable manipulation of a dial 15 having a hub portion 16 rotatably mounted on the outer end 17 of shaft 14 and provided with a plurality of finger engaging holes 18, 19, 20 and 21 in a peripheral radially extending portion 22. A stop 23 is secured to panel 12 by suitable means such as clip 24 to overlie peripheral portion 22 of the dial in the path of movement of the operator's finger in the selected hole thereof. Thus, progressively greater amounts of rotation of the dail may be effected by rotation thereof with the user's fingers in holes 18, 19, 20 and 21, respectively.

Dial 15 is retained on shaft end 17 against axial movement by an annular washer 25 and a locking ring 26 received in a suitable annular groove 27 in shaft end 17 preventing outward axial movement of the dial and one end 28 of a torsion spring 29 extending through a transverse hole 30 in shaft end 17 spaced inwardly from groove 27 preventing inward axial movement of the dial. The other end 31 of torsion spring 29 engages the dial in an opening 32 thereof to bias the dial in the direction of rotation opposite to the operational direction of rotation of shaft 14. Thus, herein, torsion spring 29 biases the dial in a counterclockwise direction as seen in FIGURE 1. As best seen in FIGURES 1 and 2, the upper face of the dial is provided with a shallow recess 33 in which is received a rounded center disc 34 covering the outer end 17 of shaft 14, the securing ring 26 and the outer end 31 of the torsion spring 29. The center disc 34 is secured to the dial by a spring clip 35 provided with legs 36 extending through hole 32 and a corresponding hole 37 diametrically opposite hole 32.

Rotation of shaft 14 is effected by dial 15 through a cam means generally designated 38 and including a first cam element 39 on dial 15 and a second cam element 40 rotatably fixed but axially movable on shaft 14. More specifically, first cam element 39 comprises a pair of depending projections on dial 15 disposed radially intermediate hub portion 16 and peripheral portion 22 thereof. As best seen in FIGURES 4 and 5, the projections are defined by a lowermost surface 41 extending in a plane perpendicular to the axis of shaft 14, a first inclined surface 42 extending circumferentially upwardly from surface 41 in a counterclockwise direction as seen in FIGURE 5 (which would be in a clockwise direction as seen in FIGURE 1), a second inclined surface 43 extending circumferentially upwardly from surface 41 in a clockwise direction as seen in FIGURE 5, a vertical radial planar surface 44 at the outer end of surface 42, and a vertical radial planar surface 45 at the outer end of surface 43.

As best seen in FIGURES 4 and 6, second cam element 40 comprises a disc having an annular upstanding peripheral portion 46 defined by a pair of uppermost surfaces 47 extending in a plane perpendicular to the axis of shaft 14, a planar surface 48 at the clockwise end of surface 47 extending in a vertical radial plane, a surface 49 extending clockwise from surface 48 in a plane perpendicular to the axis of shaft 14 and spaced below the plane of surface 47, a steeply downwardly inclined surface 50 extending clockwise from surface 49, a lowermost surface 51 extending clockwise from surface 50 and defined by a plane extending perpendicular to the axis of shaft 14, an upwardly inclined surface 52 extending clockwise from surface 51, and a surface 53 extending clockwise from surface 52 and defined by a vertical radial plane of the axis of shaft 14.

The midportion of cam element 40 comprises a hub 54 axially movable but rotatably fixed on shaft 14 by a pin 55 secured to and extending radially outwardly from shaft 14 and movable through a vertical slot 56 in hub 54. Second cam element 40 is urged upwardly against first cam element 39 by a coil spring 57 abutting at its lower end a plate 58 and abutting at its upper end the underside of cam element 40 concentrically surrounding hub portion 54. A second locking ring 59 is secured to shaft 14 and is rotatably slidable on the edges of plate 58 defining an opening 60 through which shaft 14 freely extends. A bushing 61 is secured in an opening 62 of plate 58 and a plunger 63 is vertically slidable therethrough to have abutment at its upward end with the lower surface of cam element 40 and at its lower end with a blade 64 of a switch 65 secured to the underside of plate 58 by suitable means such as screws 66. At its outer end, the blade carries a movable contact 67 which is biased by the resilient spring action of the blade into engagement with a fixed contact 68 carried by plate 58.

The operation of control apparatus 10 is as follows. Assuming that timer mechanism 13 has returned the device to the "Off" position, as seen in FIGURE 1, to initiate a subsequent timing operation the operator need merely insert his finger in a selected one of the holes 18, 19, 20 and 21, rotate the dial 15 in the manner of rotation of a telephone dial until the operator's finger strikes the stop 23, and withdraw the finger from the hole. Assuming that a complete cycle of operation is desired, the operator utilizes hole 18 in rotating the dial. This effects a rotation of the dial approximately 51° in a clockwise direction as seen in FIGURE 1. During the first portion of this rotation of the dial, cam surface 42 of the upper cam element 39 slides over the inclined surface 52 of the lower cam element thus permitting the dial to be rotated without concurrent rotation of shaft 14. However, this movement of the cam element 39 causes the lower cam element 40 to move downwardly and thereby urge the plunger 63 downwardly to space contact 67 from contact 68 of switch 65, as shown in broken lines in FIGURE 2. Switch 65 is shown connected in series with the main power supply leads L1 and L2 of the timer mechanism 13 and thus prevents operation of the timer mechanism at this time. When the dial has been rotated approximately 45° from the "Off" position vertical surface 44 of the upper cam element strikes the vertical surface 53 of the lower cam element and causes the lower cam element to move with the dial, thereby correspondingly rotating shaft 14. Upon an additional approximately 6° rotation of the dial the operator's finger abuts stop 23. The operator then withdraws his finger and the dial is reversely rotated (in a counterclockwise direction as seen in FIGURE 1) by the torsion spring 29, restoring the dial to the position relative to cam 38 wherein lowermost surface 41 of the upper cam element 39 engages lowermost surface 51 of the lower cam element 40. This permits spring 57 to move the lower cam element 40 upwardly to the position of FIGURE 2 and permits switch 65 to close, thereby initiating operation of the timer mechanism 13. The timer mechanism then operates to drive the shaft 14, carrying with it dial 15 and cam elements 39 and 40 in a clockwise direction, as seen in FIGURE 1, back to the "Off" position represented therein.

If at any time it is desired to discontinue operation of timer mechanism 13 at a given point in the operational cycle, such as to place an additional dish in the dishwasher, the operator merely rotates dial 15 in a counterclockwise direction as seen in FIGURE 1 to position dial 15 in a "hold" or "park" position. This causes surface 43 of the upper cam element 39 to slide over inclined surface 50 of the lower cam element, thereby moving the lower cam element downwardly and, correspondingly, urging the plunger 63 downwardly to open switch 65. The switch is maintained in the open condition by rotating the dial sufficiently in the counterclockwise direction to cause movement of lowermost surface 41 of the upper cam element 39 onto surface 49 of the lower cam element. Counterclockwise movement of cam element 39 relative to cam element 40 is limited by engagement of vertical surfaces 45 and 48 of these respective cam elements. Spring 29 is ineffectual to cause relative movement between the cam elements in this arrangement and thus the arrangement may be maintained without further action by the operator. Counterclockwise rotation of shaft 14 is precluded by the one-way clutch or escapement mechanism (not shown) in the driving mechanism 13. When the operator wishes to return the control apparatus to the operating condition, the dial is merely rotated in a clockwise direction as seen in FIGURE 1 sufficiently to return the surface 41 of the upper cam element into engagement with the surface 51 of the lower cam element permitting the coil spring 57 to return the lower cam element to its uppermost position and allow switch 65 to close.

Thus, in effect, a lost motion connection is provided between dial 15 and shaft 14 permitting a range of rotation of the dial without effecting concurrent rotation of the shaft 14. In the midportion of this range the lower cam element 40 is disposed in its uppermost position permitting closing of switch 65. However, when the downwardly projecting cam element 39 is disposed to either side of the midportion 51 of the recess defined by the surfaces of the lower cam element, the lower cam element is urged downwardly, thereby opening switch 65 and preventing operation of the timer mechanism.

In utilizing the other holes 19, 20 and 21, respectively, of the dial, the operator may effect, respectively, greater amounts of rotation of the shaft 14 so that lesser portions of the timing cycle are effected by the timer mechanism in returning the apparatus to the "Off" position. Illustratively, with hole 18 providing a normal wash cycle, hole 19 may be positioned to provide a short wash cycle, hole 20 may be positioned to provide a rinse cycle and hole 21 may be positioned to provide merely the final heating operation of the dishwasher such as to provide a plate warming operation. It is obvious that control apparatus 10 is well suited not only for such dishwasher control but also for control of numerous other devices such as appliances used in the home.

While I have shown and described one embodiment of my invention, it is to be understood that it is capable of many modifications. Changes, therefore, in the construction and arrangement may be made without departing from the spirit and scope of the invention as defined in the appended claims. The embodiment of the invention in which an exclusive property or privilege is claimed is defined as follows:

1. Control apparatus comprising: a shaft; timing mechanism driving said shaft in one direction of rotation to a first position from any one of a plurality of rotational positions spaced from said first position; an operating member; and cam means connecting said operating member to said shaft to rotate said shaft in said one direction of rotation upon movement of said operating member in one direction thereof, said cam means including a lost motion connection having a center driving position permitting a preselected amount of rotational movement of said operating member from the driving position in all positions of said shaft without rotation of said shaft.

2. Control apparatus comprising: a shaft; timing mechanism driving said shaft in one direction of rotation to a first position from any one of a plurality of rotational positions spaced from said first position; a device for preventing driving operation of said mechanism; an operating member; cam means connecting said operating member to said shaft to rotate said shaft in said one direction of rotation by a movement of said operating member in one direction thereof, said cam means including a lost motion connection having a center driving position providing a preselected range of rotational movement of said operating member from the driving position without rotation of said shaft; and means operated by said cam means within said range of movement for operating said device to prevent driving operation of said mechanism.

3. Control apparatus comprising: a shaft; timing mechanism driving said shaft in one direction of rotation to a first position from any one of a plurality of rotational positions spaced from said first position; a device for preventing driving operation of said mechanism; an operating member; cam means connecting said operating member to said shaft to rotate said shaft in said one direction of rotation by a movement of said operating member in one direction thereof, said cam means including a lost motion connection providing a preselected range of rotational movement of said operating member without rotation of said shaft; means biasing said operating member to a mid-position of said range of movement; and means operated by said cam means within said range of movement to either side of said mid-position to operate said device to prevent driving operation of said mechanism.

4. The control apparatus of claim 3 wherein said biasing means is operative to urge said operating member to the mid-position only from one side thereof, whereby said operating member may be retained in a disposition in said range of the other side of said mid-portion to retain the device in the arrangement wherein it prevents driving operation of said timing mechanism.

5. Control apparatus comprising: a shaft; timing mechanism driving said shaft in one direction of rotation to a first position from any one of a plurality of rotational positions spaced from said first position; a device selectably preventing driving operation of said mechanism; an operating member; a first cam element movable with said operating member; and a second cam element rotatively fixed, axially movable on said shaft and operated by said first cam element to effect rotation of said shaft as a result of rotation of said second cam element by said first cam element and arrange the device so as to prevent driving operation of said driving mechanism as a result of axial movement of said second cam element by said first cam element.

6. Control apparatus comprising: a shaft; timing mechanism driving said shaft in one direction of rotation to a first position from any one of a plurality of rotational positions spaced from said first position; a device selectably preventing driving operation of said mechanism; an operating member; a first cam element movable with said operating member; a second cam element rotatively fixed, axially movable on said shaft and operated by said first cam element to effect rotation of said shaft as a result of rotation of said second cam element by said first cam element, one cam element comprising a projection and the other cam element including a concave surface confronting said projection and having a mid-portion of greatest depth, inclined portions extending laterally from the mid-portion, and transverse portions defining the opposite ends of said concave surface; and means axially biasing said cam elements to seat the projection on said surface, said second cam being arranged to prevent driving operation of said driving mechanism as by correspondingly arranging the device upon engagement of said projection with said inclined portions to displace said second cam axially from a normal position.

7. Control apparatus comprising: a shaft; timing mechanism driving said shaft in one direction of rotation to a first position from any one of a plurality of rotational positions spaced from said first position; a device selectably preventing driving operation of said mechanism; an operating member; a first cam element movable with said operating member; a second cam element rotatively fixed, axially movable on said shaft and operated by said first cam element to effect rotation of the shaft as a result of rotation of said second cam element by said first cam element, one cam element comprising a projection and the other cam element including a concave surface confronting said projection and having a mid-portion of greatest depth, inclined portions extending laterally from said midportion, and transverse portions defining the opposite ends of said concave surface; means axially biasing said cam elements to seat said projection on said surface, said second cam being arranged to prevent driving operation of said driving mechanism as by correspondingly arranging the device upon engagement of said projection with said inclined portions to displace said second cam element axially from a normal position; and means rotatively biasing at least one of said cam elements to dispose said second cam element in the normal position with said projection at said mid-portion of said concave surface.

8. The control means of claim 7 wherein the surface includes a portion extending perpendicular to said shaft axis and said axially biasing means effects a maintained frictional engagement between said perpendicular portion and said projection, with said second cam spaced axially from the normal position.

9. Control apparatus comprising: a shaft; timing mechanism having electrically operated means driving said shaft in one direction of rotation to a first position from any one of a plurality of rotational positions spaced from said first position; a switch controlling said electrically operated means for selectably controlling driving operation of said mechanism; an operating member; and cam means connecting said operating member to said shaft to rotate said shaft in said one direction of rotation by a rotation of said operating member in one direction and operable to open said switch by a rotation of said operating member in an opposite direction.

10. A presettable sequential controller comprising: timing mechanism having a rotatable output shaft; a switch controlling energization of said timing mechanism; co-operable first and second cam elements for actuating said switch and rotating said shaft, the first of said cam elements being rotatively fixed and axially shiftable on said shaft for actuating said switch to de-energize said timing mechanism, the second of said cam elements being axially fixed and rotatable on said shaft to produce a camming action between said cam elements; and means connected to said second cam element facilitating manual rotation of said second cam element relative to said first cam element to cause said second cam element to shift said first cam element axially to actuate said switch and provide a driving connection between said cam elements to effect an angular presetting motion to said output shaft.

11. The invention set forth in claim 10 in which rotation of said second cam element in one direction effects a de-energization of said timing mechanism and an angular presetting of said output shaft while rotation of said second cam element in the opposite direction moves said second cam element into a stationary "park" position relative to said first cam element to de-energize said timing mechanism without rotating said output shaft.

12. A presettable sequential controller comprising: timing mechanism having a rotatable output shaft; a normally closed switch controlling energization of said timing mechanism; co-operable first and second cam elements on said shaft, the first of said cam elements being rotatively fixed and axially shiftable on said shaft for opening said switch, the second of said cam elements being axially fixed and rotatable on said shaft to produce a camming action between said cam elements; spring means biasing said first cam element toward said second cam element; and means connected to said second cam element facilitating manual rotation of said second cam element relative to said first cam element to cause said second cam element to shift said first cam element axially against the bias of said spring means to open said switch and provide a driving connection between said cam elements to effect an angular presetting motion to said output shaft.

13. The invention set forth in claim 12 in which rotation of said second cam element in one direction effects a de-energization of said timing mechanism and an angular presetting of said output shaft while rotation of said second cam element in the opposite direction moves said second cam element into a stationary "park" position relative to said first cam element to de-energize said timing mechanism without rotating said output shaft.

14. Control apparatus comprising: a shaft; timing mechanism having electrically operated means driving said shaft in one direction of rotation to a first position from any one of a plurality of rotational positions spaced from said first position; a switch controlling said electrically operated means for selectably controlling driving operation of said mechanism; an operating member; and cam means connecting said operating member to said shaft to rotate said shaft in said one direction of rotation by a rotation of said operating member in one direction and operable to lock said switch open by a rotation of said operating member in an opposite direction.

References Cited in the file of this patent

UNITED STATES PATENTS

| | | |
|---|---|---|
| 2,203,236 | Randolph et al. | June 4, 1940 |
| 2,287,110 | Weien | Apr. 21, 1942 |
| 2,478,690 | Furnas | Aug. 9, 1949 |
| 2,483,831 | Illian | Oct. 4, 1949 |
| 2,498,805 | Gurevsky | Feb. 28, 1950 |
| 2,526,107 | Ambrose | Oct. 17, 1950 |
| 2,536,256 | Berg | Jan. 2, 1951 |
| 2,721,441 | Boyles | Oct. 25, 1955 |
| 2,768,332 | Protzmann et al. | Oct. 23, 1956 |
| 2,782,274 | Powers et al. | Feb. 19, 1957 |
| 2,816,969 | Gallagher et al. | Dec. 17, 1957 |
| 2,839,623 | Stolle | June 17, 1958 |
| 2,916,570 | Nakamura | Dec. 8, 1959 |
| 2,966,278 | Drury | Dec. 27, 1960 |